United States Patent
Spelha et al.

[11] 3,723,735
[45] Mar. 27, 1973

[54] RADIATION DETECTING APPARATUS
[75] Inventors: David J. Spelha, Franklin Park; Marvin J. Kreuser, North Lake, both of Ill.
[73] Assignee: Nuclear-Chicago Corporation, Des Plaines, Ill.
[22] Filed: Feb. 1, 1971
[21] Appl. No.: 111,409

[52] U.S. Cl. ............ 250/71.5 R, 250/71.5 S, 250/227
[51] Int. Cl. .................................................. G01t 1/20
[58] Field of Search ............... 250/71.5 R, 71.5 S, 227

[56] References Cited

UNITED STATES PATENTS

| | | | |
|---|---|---|---|
| 3,011,057 | 11/1961 | Anger | 250/71.5 S |
| 3,509,341 | 4/1970 | Hindel et al. | 250/71.5 S |

Primary Examiner—Archie R. Borchelt
Attorney—Lowell C. Bergstedt, Walter C. Ramm, Helmuth A. Wegner and Charles H. Thomas

[57] ABSTRACT

An improved light guide for use in a radiation detecting apparatus. The areas of the surfaces of the light guide not in contact with the photomultiplier tubes or the scintillating crystal assembly are covered with a highly light absorbent coating, such as black paint. In the preferred form, V-shaped indentations extend into the surface of the light guide and encircle the light sensitive faces of the photomultiplier tubes about the periphery thereof. These V-shaped indentations are also coated with a light absorbent coating. This improvement in the construction of the light guide reduces greatly the occurrence of "hot spots", which are recordations in a two-dimensional co-ordinate system of inordinately large concentrations of light that are not actually present at certain spots in the radiation source.

10 Claims, 7 Drawing Figures

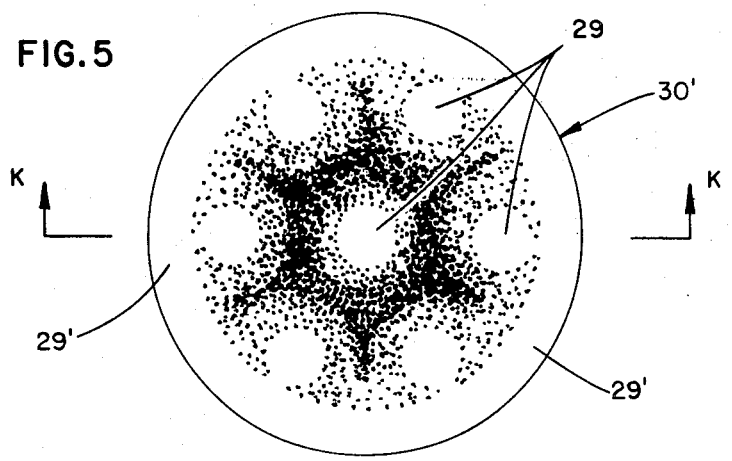
FIG. 5
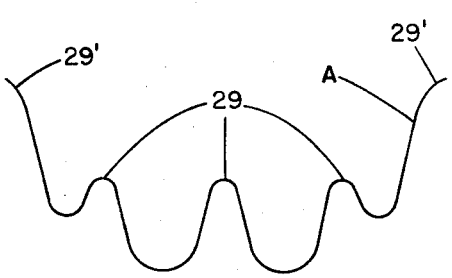
FIG. 6
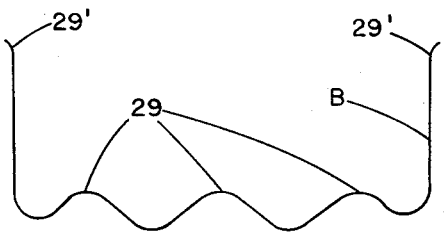
FIG. 7
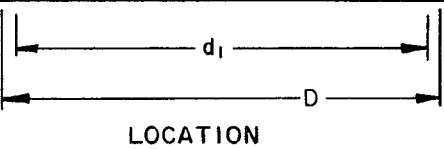

RADIATION DETECTING APPARATUS

This invention relates to an improved light guide for use in a radiation detecting apparatus. More particularly, the areas of the surfaces of the light guide not in contact with the photomultiplier tubes or the scintillating crystal assembly are covered with a highly light absorbent coating, such as black paint. This improvement reduces greatly the occurrence of "hot spots", which are recordations in a two-dimensional co-ordinate system of inordinately large concentrations of light that are not actually present at certain spots in the radiation source being scruntinized by the radiation detecting apparatus.

BACKGROUND OF THE INVENTION

Radiation detecting devices utilizing a planar scintillating crystal assembly and a plurality of photomultiplier tubes in an optical scanning arrangement with respect to the crystal assembly are currently in use in a number of applications, such as in medical diagnostic equipment. A particular form of such a radiation detecting device is described in U. S. Pat. No. 3,011,057, which describes a radiation detecting device in wide commercial use for locating a radiation source in two-dimensional coordinates. This device is known as a scintillation camera, and is widely used to rapidly project an image of the distribution of radioactivity throughout an object under investigation, such as an organ of a living subject which has ingested a diagnostic quantity of a radioactive isotope. A scintillation camera of this type produces a picture of the radioactivity distribution by detecting individual gamma rays emitted from the distributed radioactive isotope and passing through a collimator to produce a scintillation in a thin planar scintillating crystal. The scintillation is detected by an array of individual photomultiplier tubes which view overlapping areas of the crystal. Appropriate electronic circuits translate the outputs of the individual photomultiplier tubes into X and Y coordinate signals and a Z signal which indicates generally the energy of the scintillation event and whether that energy falls within a selected energy window. A visual display of the radioactivity distribution in the object may be obtained by coupling the X, Y, and Z signals to a cathode ray oscilloscope or other image display device, where the individual scintillation events are displayed as small spots of light positioned in accordance with the X and Y coordinate signals. The record of the spots of light may be obtained by either coating the screen of the oscilloscope with an image retaining phosphorescent substance or by exposing a photographic film to the oscilloscope for a period of time.

PURPOSE OF THE INVENTION

One problem frequently encountered in the type of instrument described, and in other types of radiation detecting devices, is the occurrence of "hot spots" at certain locations in the X and Y coordinate system. These "hot spots" are the registration at certain X and Y coordinates of inordinately large amounts of radioactivity which in fact are not present. These hot spots tend to distort the actual pattern of radioactivity which exists in the object scruntinized. The existence of hot spots can be illustrated by scruntinizing an object having uniform radioactivity throughout. A film exposure of an oscilloscope pattern projected by a radiation detecting device will show certain points on the oscilloscope screen as receiving a higher amount of radioactivity than neighboring locations. This, of course, is an erroneous image since the object is known to be uniformly radioactive throughout.

A seemingly unrelated feature of radiation detecting devices is disclosed herein to be related to the aforesaid problem of hot spots. In the past, it has frequently been considered desirable to channel as much light as possible from the scintillations occurring in the scintillating crystal into the light sensitive faces of the array of photomultiplier tubes in a radiation detecting apparatus. This has been achieved by utilizing a light guide with indentations in a surface thereof in contact with the light sensitive faces of the photomultiplier tubes. That is, the indentations encircle each of the light sensitive faces about the periphery thereof, and serve the dual purpose of reflecting indirect light into the photomultiplier tube associated therewith and inhibiting this indirect light from reaching more distant photomultiplier tubes. This construction has increased the resolution of the final projected image. In addition, all the surfaces of the light guide, except the areas of the surfaces in intimate contact with the scintillating crystal assembly or the light sensitive faces of the photomultiplier tubes, are frequently coated with white paint so that as much light as possible is reflected into the photomultiplier tubes. This maximization of light produced transmitted to the photomultiplier tubes from the scintillating crystal is advantageous in that it reduces the time required to obtain meaningful visual and digital records of locations of high radioactivity in an X and Y coordinate system superimposed over an object being scruntinized. This reduces the time required for examination of the object by a physician or technician. It also enables a living subject to ingest a smaller dosage of a radioisotope and still be accurately examined by the radiation detecting apparatus. The possibility of harmful side effects due to the radioisotope is thereby reduced accordingly.

Because of the advantages of maximized light channeling to the photomultiplier tubes, this practice has never been seriously questioned, although it has been recognized that coating the surfaces of the light guide not in intimate contact with the scintillating crystal assembly or the photomultiplier tubes with a more light absorbent substance would result in a decrease in the amount of light received by the photomultiplier tubes.

As an integral part of this invention, it is disclosed herein that the indiscriminate channeling of light through a light guide in a radiation detecting device is largely responsible for the occurrence of hot spots which decrease the accuracy of the device and reduce its usefulness. In particular, small deviations of a point source of light located directly in front of a photomultiplier tube about the central axis of the tube do not register changes in position but rather contribute to the creation of a hot spot in the output of a radiation detecting apparatus.

It is an object of this invention to recognize the existence of the problem of hot spots and to provide a solution therefore. Accordingly, it is a further object to construct the light guide in a radiation detecting apparatus so that indiscriminate channeling of light into the photomultiplier tubes does not occur and hot spots produced thereby are reduced to a great extent. The implementation of this invention also increases the accuracy of radiation detecting equipment utilized. This is achieved by eliminating the unrestrained light channeling present in existing devices which results in giving inordinate weight to distant scintillations in determining the matrix position of a radioactive event. Furthermore, resolution is improved because general diffusion of light in the light guide is greatly reduced.

It is a further object to increase the accuracy and usefulness of radiation detecting devices by increasing the effective field of view of a radiation detecting device. In existing radiation detecting devices, a substantial portion of the peripheral field of view is subjected to bombardment by light rays, and consequently is unavailable for effective radioactivity detection. In the device of this invention, however, the extent of this peripheral obliteration is greatly reduced, so that a given radiation detecting device may effectively examine a larger area and record more accurate quantitative data on the radioactivity detected.

Yet another object of the invention is to achieve the advantages described without incurring negating disadvantages, such as adversely affecting resolution in the radiation detecting apparatus, or prolonging observation time or requiring dangerously high dosages of radioactive isotopes to be ingested by a living subject.

BRIEF DESCRIPTION OF THE INVENTION

In a broad aspect this invention is a light guide for improving the accuracy of locating and indicating the intensity of a radiation source using two-dimensional coordinates in a radiation detecting apparatus comprising a first surface having a highly transparent area for intimate contact with a face of a scintillating crystal assembly, a second surface having highly transparent areas for intimate contact with the light sensitive faces of photomultiplier tubes, a boundary surface joining said first and second surfaces, and a highly light absorbent coating on said light guide surrounding the aforesaid highly transparent areas.

In another aspect this invention may be considered as, in a radiation detecting apparatus utilizing a planar scintillating crystal assembly having opposite faces; a plurality of photomultiplier tubes having light sensitive faces lying in a plane parallel to said scintillating crystal assembly and spaced therefrom; a light guide interposed between said scintillating crystal assembly and said photomultiplier tubes comprising an upstream surface having an area of intimate contact with one of said faces of said scintillating crystal assembly, a downstream surface having areas of intimate contact with said light sensitive faces of said photomultiplier tubes, and a boundary surface joining said upstream and downstream surfaces and spanning the distance between said scintillating crystal assembly and said light sensitive faces of said photomultiplier tubes; amplifying and computing circuitry means coupled to each of said photomultiplier tubes for computing the two-dimensional coordinates of a scintillation produced in said scintillating crystal assembly according to the quanta of radiation produced by said scintillation and sensed by each of said photomultiplier tubes; and location registration means connected to said amplifying and computing circuitry means for recording the coordinates of a scintillation, the improvement wherein the areas of the surfaces of said light guide in intimate contact with said scintillating crystal assembly and said light sensitive faces of said photomultiplier tubes are highly transparent, and the surfaces of said light guide are elsewhere covered with a highly light absorbent coating.

In one particular embodiment, the radiation detecting device is a radiation imaging apparatus, and the location registration means is an image display means for visually indicating the coordinates of a scintillation.

BRIEF DESCRIPTION OF THE DRAWINGS

FIG. 5 is an enlarged view of a time exposed photograph of the screen of an image display means.

FIG. 6 is a plot of light intensity along the line K—K on the screen of FIG. 5 in a prior art device.

FIG. 7 is a plot of light intensity along the line K—K of the screen of FIG. 5 in a device improved according to this invention.

DETAILED DESCRIPTION OF THE INVENTION

Figure 2:
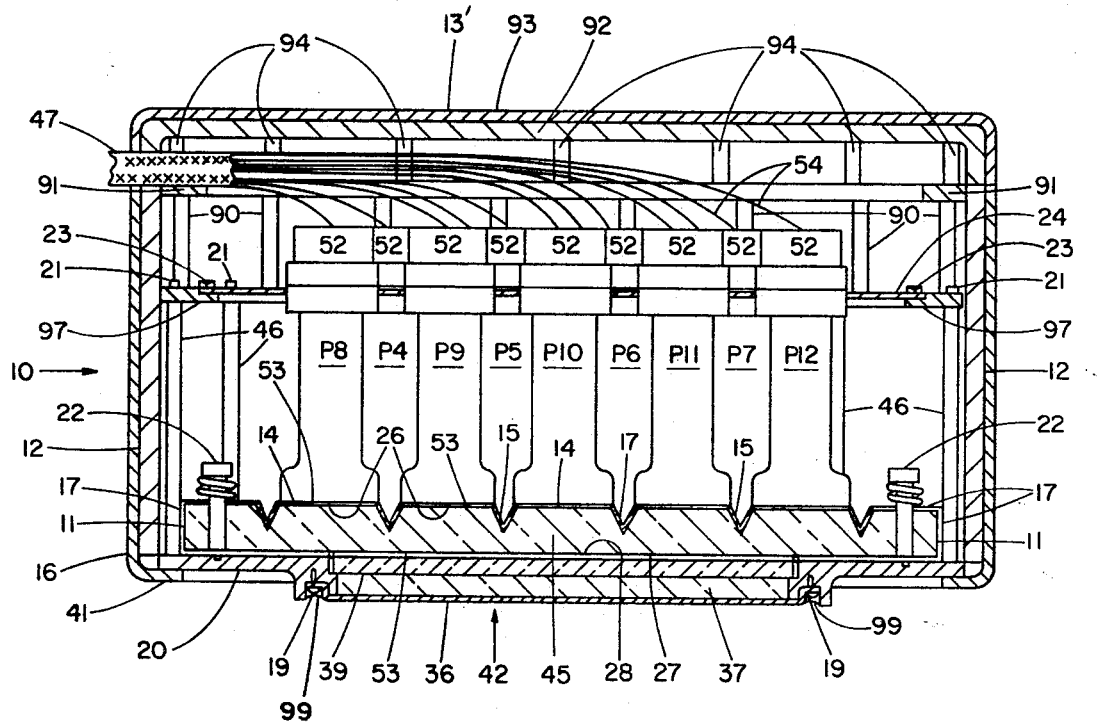
FIG. 2 is a sectional elevational view of a portion of a radiation detecting apparatus constructed in accordance with FIG. 1.
Figure 1:
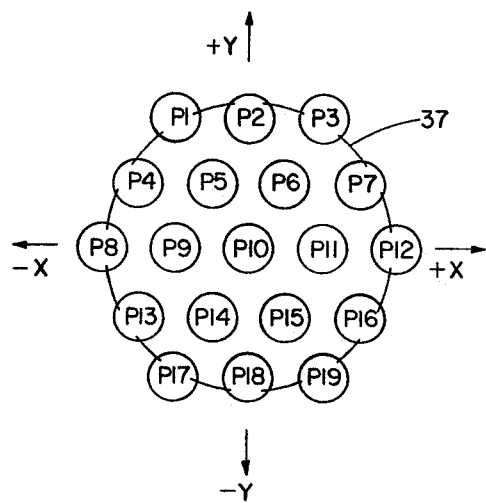
FIG. 1 diagrammatically illustrates the geometric relationship between the photomultiplier tubes and the scintillating crystal in this invention.

Referring now to FIGS. 1 and 2, there is illustrated a portion of a radiation detecting apparatus for locating a radiation source in two-dimensional coordinates and for indicating the intensity of radiation produced by the radiation source. A radiation receiving head is comprised of a generally tubular portion 10 having a metal jacket 16 within which is disposed a radiation shield 12, comprised of lead or other radiation absorbing material. A similar radiation shield 92 is located within flanged casing disk 93 which together form the lead cover 13 disposed above the tubular portion 10 to house the radiation receiving head. The lower edge of jacket 16 terminates in an inwardly extending flange 41 which supports an annular steel frame 20 and a scintillating crystal assembly 42. The operative element of the scintillating crystal assembly 42 is the scintillating crystal 37 which is entrapped between the other parts of the scintillating crystal assembly which further consists of a thin aluminum shield 36 and a transparent glass cover disk 39. The scintillating crystal 37 is a thalium activated sodium iodide crystal. Because the crystal 37 is hygroscopic, it must be completely encapsulated by the aluminum shield 36, the glass disk 39, and the steel frame 20 in order to avoid possible damage from water or water vapor. Aluminum shield 36 is fastened to frame 20 by means of machine screws 19 which are embedded in a potting compound 99. The light guide 45 is held in intimate contact with the glass cover disk 39 of the scintillating crystal assembly 42 by means of spring biased bolts 22 which extend through the light guide and into the steel frame 20.

Within the radiation detector head are positioned a plurality of photomultiplier tubes having light sensitive faces lying in intimate contact with the light guide 45. Nineteen photomultiplier tubes are used in the preferred arrangement, and these are positioned above the scintillating crystal 37 in the manner illustrated in FIG. 1. It can be seen that the light sensitive faces 26 of the photomultiplier tubes lie in a plane parallel to the scintillating crystal assembly 42 and are spaced therefrom with the light guide 45 interposed therebetween. From FIG. 1, it can be seen that the photomultiplier tube P10 lies above the exact center of the scintillating crystal 37, and the center of the light sensitive face of the photomultiplier tube P10 is the center of a two-dimensional coordinate system divided into quadrants by an X axis and a Y axis, as indicated in FIG. 1. It should be noted that the view of FIG. 2 corresponds to a section taken along the X axis of FIG. 1. The photomultiplier tubes are laterally restrained at their upper ends by a restraining plate 24, which is attached to the bearing ring 97 by means of screws 23. Bearing ring 97 is fastened to the upper ends of upright columns 46 by screws 21. The lower ends of columns 46 are fastened to annular frame 20 by means of flathead screws (not visible). Extension columns 90 extend upward from bearing ring 97 at spaced intervals offset from columns 46. Extension columns 90 are attached at their lower ends to bearing ring 97 and at their upper ends to an intermediate annular ring 91. Cover bearing supports 94 extend upward from intermediate ring 91 and are fastened thereto at spaced intervals offset from columns 90. The supports 94 carry the weight of the cover 13.

The photomultiplier tubes P1 through P19 are normally spring biased into intimate contact with the light guide 45 by coil springs positioned about the photomultiplier tubes and maintained in compression by the lower ends of photomultiplier tubes P1 through P19 and by restraining plate 24. These springs have been omitted to improve the clarity of the illustrations by avoiding unnecessary detail. The upper ends of the photomultiplier tubes are each plugged into an electrical socket 52 from which cords 54 containing electrical leads extend. Cords 54 are combined into a cable 47 that leaves the radiation detecting head and connects the radiation detecting head to the remainder of the radiation imaging apparatus.

Figure 4:
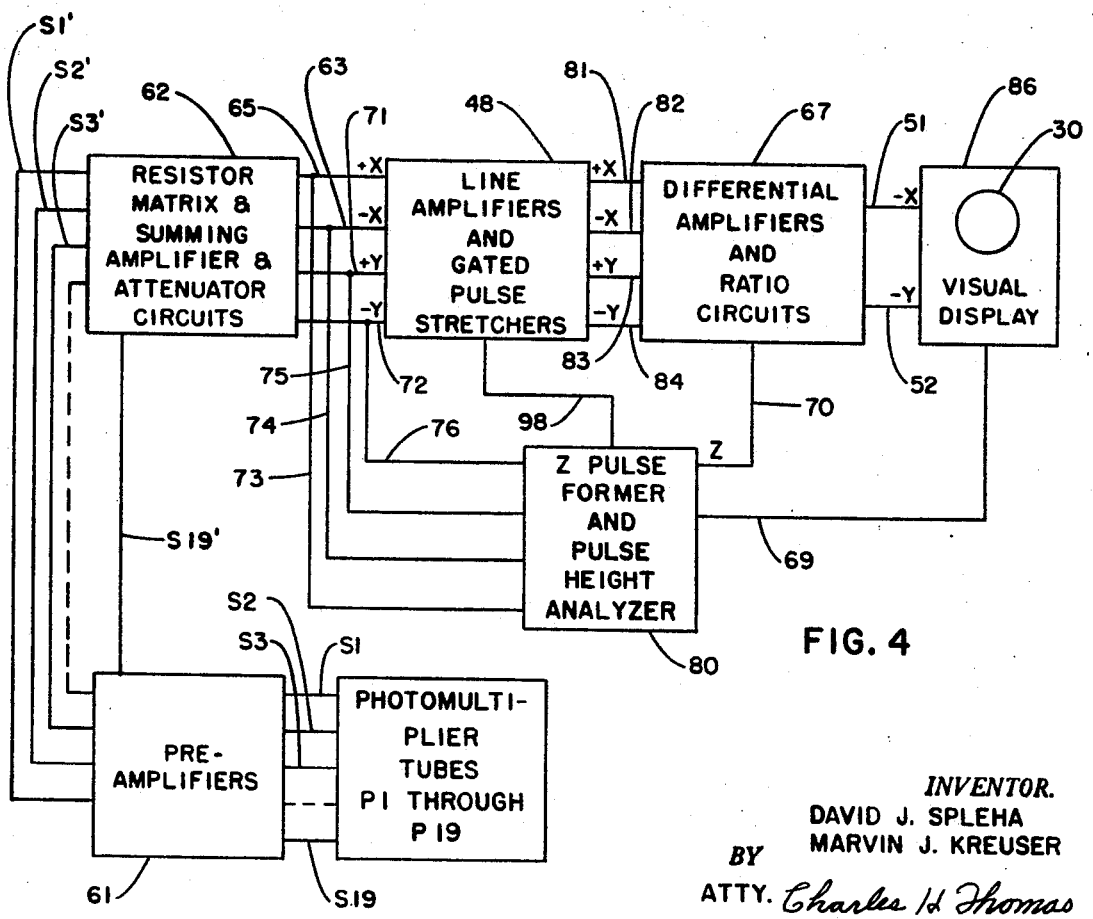
FIG. 4 is a block diagram of the electrical circuitry of the embodiment of the radiation detecting apparatus illustrated.

Within each of the sockets 52 is located a preamplifier as indicated generally at 61 in the block diagram of FIG. 4. The preamplifiers at 61 along with the resistor matrix and summing and attenuator circuitry at 62, the Z pulse former and pulse height analyzer at 80, the line amplifiers and gated pulse stretchers at 48, and the differential amplifiers and ratio circuits at 67 form the amplifying and computing circuitry means of this invention in the embodiment illustrated. The photomultiplier tubes P1 through P19 function together to detect a scintillation in the scintillating crystal 37. Signals from each of the photomultiplier tubes are carried separately on leads S1, S2, S3, etc. to the preamplifiers at 61. The amplified outputs of each of the photomultiplier tubes are carried on leads S1', S2', S3', etc. to a resistor matrix and summing amplifier and attenuator circuits indicated generally at 62. The values of the resistors in the resistor matrix associated with each photomultiplier tube vary depending upon the location of the tube in the X and Y coordinate system. The summing amplifier circuit develops four coordinate output signals: $+x$, $-x$, $+y$, and $-y$. These signals are attenuated equally and appear on lines 65, 63, 71, and 72 respectively. These four output signals are transmitted to line amplifiers and gated pulse stretchers indicated generally at 48, and to a Z pulse former and pulse height analyzer indicated generally at 80. The Z pulse former combines the four input signals into a Z signal which represents the energy of a scintillation event and is an input on line 70 to differential amplifier and ratio circuits indicated generally at 67. The pulse height analyzer gates on the gated pulse stretchers through line 98 if the energy of a scintillation event falls within a selected energy window so that the stretched $+x$, $-x$, $+y$, and $-y$ signals on lines 81, 82, 83, and 84 respectively are presented to differential amplifiers and ratio circuits indicated at 67. The differential amplifiers subtract the $+x$ and $-x$ signals and the $+y$ and $-y$ signals. The results are ratioed with the Z pulse on line 70 as the denominator to produce $x$ and $y$ coordinate signals on lines 51 and 52 respectively. The pulse height analyzer also produces an unblanking signal on lead 69 as an input to the image display means when the analyzer has determined that a scintillation event falls within a selected energy window. The visual display means illustrated takes the form of an oscilloscope 86 having a screen 30. Upon receipt of the unblanking signal on line 69, a spot of light appears on the oscilloscope screen 30 in accordance with the input position coordinates $x$ and $y$ transmitted on lines 51 and 52 respectively.

It should be kept in mind that where an analysis of the photomultiplier tube signals other than a visual display is desired, a type of location registration means other than the oscilloscope 86 may be used for recording the coordinates of a scintillation. In this case, the amplifying and computing circuitry means would be connected to a different type of location registration means, such as a digital computer, for example. In this case the signals from the photomultiplier tubes on leads S1 through S19 would be digitized at or before reaching the lines 51, 52, and 69, or leads corresponding thereto.

Figure 3:
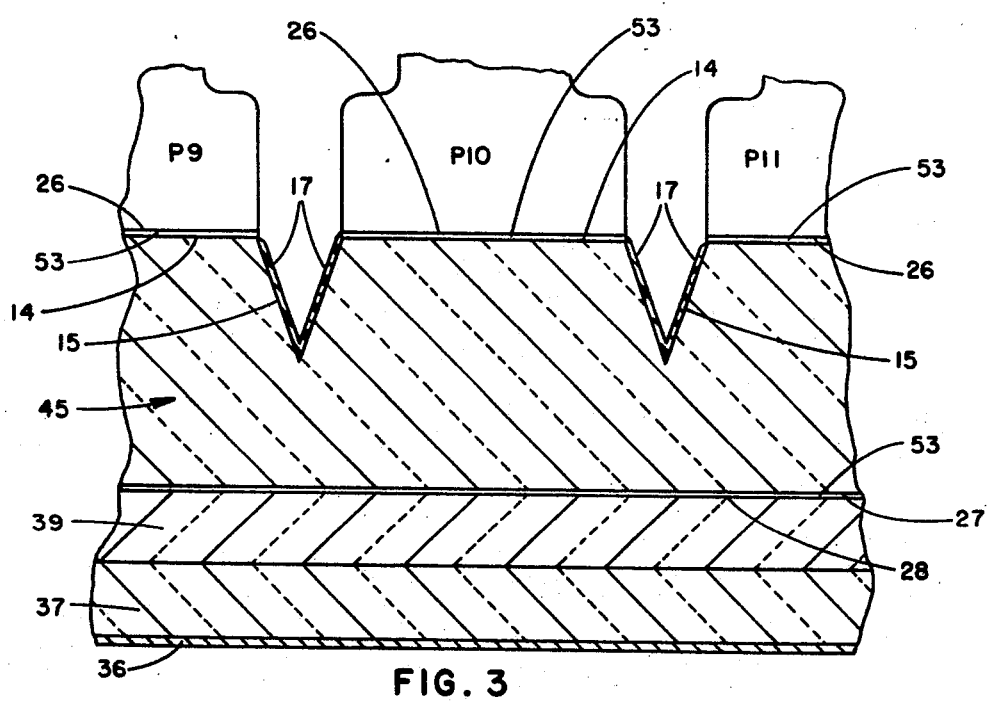
FIG. 3 is an enlarged view of a portion of FIG. 2.

The description of the illustrated embodiment to this point has been a description of a conventional form of a radiation imaging apparatus. The novelty of the invention disclosed herein lies in the construction of the light guide 45 which is best illustrated in FIG. 3. The light guide 45 has a first surface 27 having a highly transparent area of intimate contact with one of the faces 28 of the scintillating crystal assembly 42. In the embodiment illustrated, this first surface 27 of light guide 45 may be considered as the upstream surface, since the energy from a flash of light in the scintillating crystal 37 will first enter the light guide 45 through the surface 27. A layer 53 of conventional optical coupling compound intimately joins the surface 27 and the face 28 in intimate contact. This optical coupling compound is of a conventional type for preventing a large index of refraction at an optical interface. One suitable optical coupling compound is that marketed by the Dow Corning Company with a stock number of 20–057. The light guide 45 is also comprised of a second or downstream surface 14 having highly transparent areas in intimate contact with the light sensitive faces 26 of the photomultiplier tubes. Again, layers 53 of the same optical coupling compound join the transparent areas of surface 14 in intimate contact with the light sensitive faces 26. Light guide 45 is further comprised of a boundary surface 11 joining the downstream surface 14 and the upstream surface 27 and spanning the distance between the face 28 of the scintillating crystal assembly 42 and the light sensitive faces 26 of the photomultiplier tubes. With the exception of the highly transparent areas of the surfaces 14 and 27 in intimate contact with the scintillating crystal assembly and the photomultiplier tubes, the surfaces of the light guide 45 are elsewhere covered with a highly light absorbent coating 17. This coating 17 covers the entire boundary surface 11 and the peripheral portion of the upstream surface 27 that is in contact with the annular steel frame 20. The layer 17 also covers the peripheral portion of the downstream face 14 as well as the walls of the indentations 15 extending into the downstream surface 14 about the periphery of each of the photomultiplier tubes. These indentations encircle each of the light sensitive faces 26 about the periphery thereof and are of a uniform V-shaped cross section throughout. These V-shaped indentations are used in preferred embodiments of conventional radiation imaging devices to channel the light flashes from scintillations in the scintillating crystal 37 into the photomultiplier tube nearest the scintillation, and to reduce the amount of light transmitted to more distant photomultiplier tubes. This manner of increasing resolution is still useful in conjunction with the present invention, but whereas the prior teaching indicated that the walls of the indentations 15 should be rendered highly reflective in order to channel light into the photomultiplier tubes, the opposite effect is desired and achieved with the highly light absorbent coating 17 in the present invention.

As has been discussed, indiscriminate channeling of light into photomultiplier tubes results in the formation of hot spots in the two-dimensional coordinate system. FIG. 5 illustrates the formation of these hot spots 29 in the modified oscilloscope screen 30'. The screen 30' has a diameter D and differs from the oscilloscope screen 30 in FIG. 4 only in that it is coated with phosphors to retain the image of a spot of light appearing on the screen for a period of time. The visual image of FIG. 5 may also be produced by a time exposure of a photographic film to the oscilloscope screen 30. In either event, the pattern of hot spots 29 formed on the oscilloscope screen will occur whenever an object of uniform radioactivity throughout is positioned in the field of view of scintillating crystal 37. Whereas an object of uniform radioactivity should produce a uniform quantity of light spots throughout the oscilloscope screen, it can be seen that the hot spots 29 are much brighter in FIG. 5 due to the excessive channelization of light by conventional radiation detecting instruments. The pattern of hot spots formed includes a central hot spot 29 and six additional hot spots spaced an approximate equal distance about the central hot spot 29. In addition to the hot spots 29, there is also an annular ring 29' of high light intensity about the periphery of the oscilloscope screen. The high intensity of lightin this area is attributable to indirect light reflected into the photomultiplier tubes from the peripheral portions of the light guide 45 at and adjacent to the boundary surface 11. A plot of light intensity against location along the line K—K of FIG. 5 utilizing a conventional radiation detecting apparatus is illustrated in FIG. 6 by the curve A. It can be seen that the light intensity, which ideally should be plotted as a horizontal straight line, exhibits extreme variations with hot spots occurring at the locations 29 and with a rather large annular light flooded areas 29' leaving an effective viewing area in the form of a disk having a diameter $d_o$. A similar section of FIG. 5 utilizing a radiation detecting apparatus improved according to this invention is illustrated in FIG. 7. By comparing the curve B of FIG. 7 with the curve A of FIG. 6 it can be seen that the light intensity of the hot spots 29 is markedly reduced using the improved light guide of this invention. Furthermore, the annular light flooded ring 29' drops off sharply from the edge of the oscilloscope screen leaving an effective viewing area in the form of a disk having a diameter $d_i$. It can be seen that diameter $d_i$ is significantly larger than diameter $d_o$, thereby illustrating the fact that implementation of this invention increases the effective viewing area of the radiation detecting apparatus in which it is utilized. A larger organ or other subject may thereby be scrutinized in a single placement of the radiation receiving head with a resultant saving of time and manipulation in the operation of the radiation detecting apparatus.

The curves A and B in FIGS. 6 and 7 respectively are not intended to be drawn to scale, and are depicted for qualitative analysis only.

It has been found that a very suitably light absorbing coating 17 illustrated in FIGS. 2 and 3, may be formed on an otherwise conventional light guide. The areas of the light guide 45 which are to be positioned in intimate contact with either the light sensitive faces of the photomultiplier tubes or the scintillating crystal assembly are first covered with a masking shield to prevent the coating from forming on these areas. Thereafter, a paint primer, such as the Primer 901–P1 marketed by the Minnesota Mining and Manufacturing Company is sprayed onto the unshielded smooth surfaces of the light guide in a translucent layer. The primer may be dried by baking for about one half hour at 150°F. Thereafter, a low reflectivity black paint, such as a paint marketed under the trade name of Nextel, No. 101–C10 produced by the Minnesota Mining and Manufacturing Company, is sprayed in a layer over the primer on the unshielded portions of the surfaces of the light guide 45. Upon drying in ambient air conditions, the interior layer of paint primer and the exterior layer of black paint form a very excellent light absorbent coating for the purposes of this invention. The masking shield is removed from the highly transparent areas, and the light guide may be installed in a conventional manner in a radiation detecting apparatus.

The above disclosure and drawings have been given for purposes of illustration only, and no unnecessary limitation should be construed therefrom. For example, other modifications of the general type of radiation detecting apparatus currently in use may be substituted for that described herein.

We claim as our invention:

1. A light guide for improving the accuracy of locating and indicating the intensity of a radiation source using two-dimensional coordinates in a radiation detecting apparatus employing an array of photodetectors each positioned at a unique location in a two-dimensional coordinate system, and for attenuating the erroneous registration in the two-dimensional coordinate system of apparent localized concentrations of radiation simulated internally within the radiation detecting apparatus, comprising a first surface having a highly transparent area for intimate contact with a face of a scintillating crystal assembly, a second surface having highly transparent areas for intimate contact with the light sensitive faces of the photodetectors, a boundary surface joining said first and second surfaces, and a highly light absorbent coating on the light guide surrounding the aforesaid highly transparent areas.

2. The light guide of claim 1 wherein said light absorbent coating is comprised of an interior layer of paint primer and an exterior layer of black paint.

3. The light guide of claim 1 wherein said second surface has indentations thereon encircling each of said highly transparent areas for intimate contact with the light sensitive faces of photomultiplier tubes.

4. The light guide of claim 3 wherein said indentations are of a uniform V-shaped cross section throughout.

5. The light guide of claim 1 wherein said light guide is a transparent plastic structure.

6. The light guide of claim 1 wherein said light guide is a transparent glass structure.

7. A radiation detecting apparatus for locating a radiation source in two-dimensional coordinates, for indicating the intensity of radiation produced by said radiation source, and for attenuating the erroneous registration in a two-dimensional coordinate system of apparent localized concentrations of radiation simulated internally within the radiation detecting apparatus, comprising:

a. a planar scintillating crystal assembly having opposite faces,
  b. a plurality of photodetectors having light sensitive faces and lying at unique locations in the two dimensional coordinate system in a plane parallel to said scintillating crystal assembly and spaced therefrom,
  c. a light guide interposed between said scintillating crystal assembly and said photodetectors comprising an upstream surface having a highly transparent area in intimate contact with one of said faces of said scintillating crystal assembly, a downstream surface having highly transparent areas in intimate contact with said light sensitive faces of said photodetectors, a boundary surface joining said downstream and upstream surfaces and spanning the distance between said scintillating crystal assembly and said light sensitive faces of said photodetectors, and a highly light absorbent coating on said light guide surrounding the aforesaid areas of intimate contact with said scintillating crystal assembly and said light sensitive faces of said photodetectors,
  d. amplifying and computing circuitry means coupled to each of said photodetectors for computing the two-dimensional coordinates of a scintillation produced in said scintillating crystal assembly according to the quanta of radiation produced by said scintillation and sensed by each of said photodetectors, and
  e. location registration means coupled to said amplifying and computing circuitry means for recording the coordinates of a scintillation.

8. The radiation detecting apparatus of claim 7 wherein said location registration means is an image display means for visually indicating the two-dimensional coordinates of a scintillation.

9. In a radiation detecting apparatus utilizing a planar scintillating crystal assembly having opposite faces; a plurality of photodetectors having light sensitive faces and lying at unique locations in a two-dimensional coordinate system in a plane parallel to said scintillating crystal assembly and spaced therefrom; a light guide interposed between said scintillating crystal assembly and said photodetectors comprising an upstream surface having an area of intimate contact with one of said faces of said scintillating crystal assembly, a downstream surface having areas of intimate contract with said light sensitive faces of the photodetectors, and a boundary surface joining said downstream and upstream surfaces and spanning the distance between said scintillating crystal assembly and said light sensitive faces of said photodetectors; amplifying and computing circuitry means coupled to each of said photodetectors for computing the two-dimensional coordinates of a scintillation produced in said scintillating crystal assembly according to the quanta of radiation produced by said scintillation and sensed by each of said photodetectors; and location registration means connected to said amplifying and computing circuitry means for recording the coordinates of a scintillation; the improvement wherein the areas of the surfaces of said light guide in intimate contact with said scintillating crystal assembly and said light sensitive faces of said photomultiplier tubes are highly transparent, and the surfaces of said light guide are elsewhere covered with a highly light absorbent coating whereby erroneous registration in the two-dimensional coordinate system of apparent localized concentrations of radiation simulated internally within the radiation detecting apparatus is attenuated.

10. In a radiation imaging apparatus utilizing a planar scintillating crystal assembly having opposite faces; a plurality of photodetectors having light sensitive faces and lying at unique locations in a two-dimensional coordinate system in a plane parallel to said scintillating crystal assembly and spaced therefrom; a light guide interposed between said scintillating crystal assembly and said photodetectors comprising an upstream surface having an area of intimate contact with one of said faces of said scintillating crystal assembly, a downstream surface having areas of intimate contact with said light sensitive faces of said photodetectors, and a boundary surface joining said downstream and upstream surfaces and spanning the distance between said scintillating crystal assembly and said light sensitive faces of said photodetectors; amplifying and computing circuitry means coupled to each of said photodetectors for computing the two-dimensional coordinates of a scintillation produced in said scintillating crystal assembly according to the quanta of radiation produced by said scintillation and sensed by each of said photodetectors; and an image display means connected to said amplifying and computing circuitry means for visually indicating the coordinates of a scintillation; the improvement wherein the areas of the surfaces of said light guide in intimate contact with said scintillating crystal assembly and said light sensitive faces of said photodetectors are highly transparent, and the surfaces of said light guide are elsewhere covered with a highly light absorbent coating whereby erroneous registration in the two-dimensional coordinate system of apparent localized concentrations of radiation simulated internally within the radiation detecting apparatus is attenuated.

* * * * *